US008650539B2

(12) United States Patent
Göbel (10) Patent No.: US 8,650,539 B2
(45) Date of Patent: Feb. 11, 2014

(54) METHOD FOR MAPPING THE STRUCTURE OF A COMPLEX SOFTWARE PRODUCT (75) Inventor: Michael Göbel, Uttenreuth (DE)

(73) Assignee: Siemens Aktiengesellschaft, Munich (DE)

( * ) Notice: Subject to any disclaimer, the term of this patent is extended or adjusted under 35 U.S.C. 154(b) by 1491 days.

(21) Appl. No.: 11/987,739

(22) Filed: Dec. 4, 2007

(65) Prior Publication Data

US 2008/0155494 A1    Jun. 26, 2008

Related U.S. Application Data (60) Provisional application No. 60/876,254, filed on Dec. 21, 2006.

(51) Int. Cl.
*G06F 9/44* (2006.01)

(52) U.S. Cl.
USPC ............................ 717/120; 717/123; 717/124

(58) Field of Classification Search
None
See application file for complete search history.

(56) References Cited

U.S. PATENT DOCUMENTS

| | | | | |
|---|---|---|---|---|
| 5,729,744 | A * | 3/1998 | Gerken et al. | 717/122 |
| 6,256,773 | B1 * | 7/2001 | Bowman-Amuah | 717/121 |
| 6,536,037 | B1 * | 3/2003 | Guheen et al. | 717/151 |
| 6,601,234 | B1 * | 7/2003 | Bowman-Amuah | 717/108 |
| 6,718,547 | B2 * | 4/2004 | Takeo | 717/170 |
| 6,725,453 | B1 * | 4/2004 | Lucas et al. | 717/173 |
| 7,222,341 | B2 * | 5/2007 | Forbes et al. | 717/170 |
| 7,735,080 | B2 * | 6/2010 | Barturen et al. | 717/177 |
| 8,037,453 | B1 * | 10/2011 | Zawadzki | 717/123 |
| 2002/0092006 | A1 * | 7/2002 | Takeo | 717/168 |
| 2002/0144248 | A1 * | 10/2002 | Forbes et al. | 717/167 |
| 2003/0046681 | A1 * | 3/2003 | Barturen et al. | 717/177 |
| 2003/0182652 | A1 * | 9/2003 | Custodio | 717/122 |
| 2004/0054988 | A1 * | 3/2004 | Atallah et al. | 717/122 |
| 2005/0081189 | A1 * | 4/2005 | Krasikov et al. | 717/123 |
| 2006/0143594 | A1 * | 6/2006 | Grimaldi | 717/123 |
| 2008/0028378 | A1 * | 1/2008 | Biswas et al. | 717/101 |

OTHER PUBLICATIONS

Conradi, Reidar and Bernard Westfechtel. "Version Models for Software Configuration Management.", Jun. 1998. ACM Computing Surveys, vol. 30, No. 2. pp. 232-282.*
Pinzger, M., Gall, H., Fischer, M., Lanza, M. Software Visualization, Proceedings of the 2005 ACM Symposium on Software Visualization, 2005; Others; 2005.
Lanza, M. Ducasse, S. Proceedings of LMO 2002 (8th International Conference on Languages et Modeles a Objects), Montpellier, France, Hermes Science Publications, Paris, France, pp. 135-149; Others.

* cited by examiner

*Primary Examiner* — Don Wong
*Assistant Examiner* — Erika Kretzmer
(74) *Attorney, Agent, or Firm* — Harness, Dickey & Pierce, P.L.C.

(57) ABSTRACT

To allow simplified illustration of the complex technical relationships for a complex software product, provision is made for the structure of the complex software product to be mapped, in at least one embodiment, using an at least three-dimensional system matrix. In this context, the latter is generated by the variables functionality, program components and version level. The complex software product of at least one embodiment is formed by a plurality of functionalities, each functionality being formed by the interaction of a plurality of executable program components associated with it and the program components having one of a plurality of possible version levels. In at least one embodiment, the system matrix is used to check, verify and possibly extend a customer configuration for the software product. At the same time, the matrix is also used to extend the complex software product on the software provider side.

16 Claims, 3 Drawing Sheets

METHOD FOR MAPPING THE STRUCTURE OF A COMPLEX SOFTWARE PRODUCT

PRIORITY STATEMENT

The present application hereby claims priority under 35 U.S.C. §119(e) on U.S. provisional patent application No. 60/876,254 filed Dec. 21, 2006, the entire contents of which is hereby incorporated herein by reference.

FIELD

An embodiment of the invention generally relates to a method for mapping the structure of a complex software product.

BACKGROUND

A complex software product is understood to mean particularly a software program which is tailored to one specific application, one specific application area or one specific professional group and combines different functionalities within this tailoring. The software product is therefore used to supervise or control a complex multilayer system, so that a universal software product can be used to handle a wide variety of requirements within a complex system uniformly and different software products are not required.

In the medical sector, for example in the clinical application area or in the area of doctors' practices, a wide variety of requirements are implemented within a complex software program. The requirements range from managing patient-specific data, for example, to assisting in medical diagnosis or medical therapy. Specifically in the area of medical diagnosis/therapy using imaging methods, for example using X-ray beams or magnetic fields, software support is an absolute necessity.

Such software products are usually developed and provided by the appliance manufacturers of medical appliances and are supplied with the appliances. The appliance manufacturers also appear as full system providers in the medical sector and, by way of example, also provide a comprehensive, complex software product mapping the operation of a clinic. This product also incorporates a clinical information system, for example, in which not only administration-related data but also, in particular, patient-specific data, such as diagnostic pictures, diagnoses produced by doctors and other reports are stored uniformly and hence can be retrieved by any authorized person at any time.

Further developments are continually occurring both on the hardware side of the medical appliances and on the software side for supporting the individual appliances. A complex software product therefore needs to be matched to the further developments in the course of time. Also, new appliances are picked up in the course of time whose appliance-specific software needs to be integrated into the complex software product. The methods for picture generation or else picture evaluation are also continually being refined and improved, which means that new algorithms are repeatedly being provided which are used for first-time evaluation of the measurement data ascertained using an X-ray diagnostic appliance, for example, better or in respect of a specific medical question. Different evaluation models are also usually provided which, by way of example, allow the extraction of two-dimensional picture data or the extraction of three-dimensional picture data from measurement data obtained. In the same way, different program modules may be provided for different actuation of the individual medical appliances.

For a multiplicity of reasons, it is therefore necessary to adapt and/or extend a software product installed at a customer's premises (e.g. clinic, doctors' practice) in order to provide a new application functionality.

The complexity of the respective software product, which may also differ in form from customer to customer, means that the smoothest possible extension of an existing system by new application functionality requires knowledge of the existing software product installed with the customer. For the software provider dealing with the customer to obtain knowledge about the software product installed with the customer, the customer-specific data are usually requested and laboriously compiled in advance of an extension. In this context, however, there is the problem that the wealth of different information about the respective customer-specific system means that it is possible to obtain an overview about the complex software product actually used by the respective customer only with difficulty or not all.

In addition, it is also of particular importance for the software provider to have precise knowledge about the interaction of the individual parts of the software product when an existing software product is developed further, so that new functionalities can be incorporated and tested as part of software further development before this new functionality is provided for the customer.

SUMMARY

At least one embodiment of the invention allows the structure of a complex software product to be mapped in simple fashion.

Accordingly, the complex software product of at least one embodiment comprises a plurality of functionalities, each functionality being formed by the interaction of a plurality of executable program components associated with it. The program components also have one of a plurality of version levels. The association between the individual program components at their respective version level and the functionalities is stored in an at least three-dimensional system matrix. In this context, this system matrix is generated by a "functionality" variable, a "program component" variable and a "version level" variable.

In this context, functionalities of the software product are understood to mean self-contained functional areas of the complex software product. The individual functionalities form individual function blocks which, when put together, produce the overall functionality of the complex software product. Each individual functionality can therefore be compared with a self-contained program which is designed for a particular requirement (function). The functionalities can be distinguished between application functionalities and system functionalities. Application functionalities are understood to mean functionalities which a customer requires for specific applications.

By way of example, application functionalities are function blocks which can be used to actuate a measuring appliance, to evaluate measurement data for diagnostic purposes, for example, to maintain and/or evaluate administration data etc. Thus, by way of example, a specific three-dimensional evaluation of picture measurement data from an imaging medical system or else a specific evaluation of measurement data for an osteoporosis diagnosis each form a separate functionality. In principle, every different medical examination/treatment type, i.e. the diagnosis or therapy of different symptoms, represents a separate functionality.

By contrast, system functionalities are functionalities which the computer system requires, for example in order to allow interaction between the different hardware components of the computer system. Examples of such system functionalities are a "media support" function block, which can be used to control, by way of example, the output of data on a desired medium, such as paper, a storage medium, the Internet etc. Another example of a system functionality is network support, that is to say the capability of the data provided by the respective application functionality to be provided over or in a network.

Program components are understood to mean executable programs, particularly what are known as DLL (Dynamik Link Library) program libraries or else what are known as Windows EXE programs. Usually, several of the program components are required in order to be able to provide a functionality. Execution of a functionality is therefore first made possible by the interaction of a plurality of program components. Program components therefore form a plurality of executable subroutines within a closed software program (functionality). Since different functionalities in some cases access the same program components when executed, a respective program component may be associated with a plurality of functionalities within the complex software product. In this context, association is understood to mean that execution of the respective functionality involves it accessing, that is to say using, the program component.

One example of a program component is a "user interface" program component. By way of example, this actuates a monitor, defining the screen view, particularly what symbols are displayed to the user on the screen. When a new hardware component is integrated, for example, this "user interface" program component is used to define a new icon which represents the new implemented appliance.

Examples of other program components are the components "configuration", "communication", "media tool kit". The "configuration" program component configures what user has what access rights. That is to say that this involves performing a certain system configuration in respect of rights administration operations, in particular, or else the setup of user-defined settings. The "communication" program component is used to control the communication between the individual hardware components and the software. In particular, implementation of a new appliance involves its being made known to the software in this context, so that the technical appliances can be actuated using the software, for example. The "media tool kit" program component actuates the individual media appliances, such as data storage media, printers, Internet output etc. By way of example, the "media tool kit" program component is formed or contains a special burner routine for burning data storage media (CDs, DVDs).

The executable program components are usually developed further in the course of time, for example in order to correct errors which have occurred during operation. The individual program components at their different stages of development are characterized by different version levels in this case. Each program component usually has different versions. Within an existing complex software product, it is possible to use different versions of the same program components in this case. This is necessary for example when a new functionality requires a program component at a higher version level (further development) but this is integrated only at a lower version level.

To allow meaningful and comprehensive mapping of a complex software product, provision is made for said product to be shown in a multidimensional, particularly three-dimensional, system matrix. The matrix is generated by the variables "functionality", "program component" and "version level". In this case, matrix is understood to mean an at least three-dimensional, in particular geometric, structure within which entries (values) are associated with the individual variables (for example by placing a cross). In particular, the structure is generated by three axes of a Cartesian coordinate system, where the axes form variable axes. The "values" of the individual variables are discrete and are formed by a descriptor (alphanumeric or numeric) which characterizes the respective functionality, program component, version level.

Within the matrix, a respective particular functionality is thus simply provided with a statement regarding what program components at what version level it accesses. This is done for every functionality, so that the result is simply full mapping of the complex software product.

This process of mapping within a multidimensional matrix involves the consideration that the complex technical relationships within a complex software product can be represented in a very abstract but simple and easily surveyed manner without fundamental technical information about the structure of the software product being lost. The fundamental advantage of this simplified representation can be seen in that a standardized, uniform mapping scheme or pattern is provided.

This scheme defined in this way can be used to map all technically different configurations of a general complex software product. In this context, general software product is understood to mean the sum of all possible functionalities and program components in their respective versions which are provided by the software provider. From this total number of all possible functionalities, program components and version levels, the widest variety of configurations are compiled and then form the complex software product used by a customer, for example. Configuration is therefore understood to mean a particular compilation or selection from the total number of all function blocks, program components at their respective version levels. The term "customer configuration" is subsequently understood to mean a special configuration of the kind actually in use by a customer, for example at a clinic.

The matrix therefore maps a respective specific configuration in a technical respect and provides all the necessary information about an existing or else scheduled configuration. The particular advantage of the matrix can be seen in that this simplified information can be taken as a basis for reading off technical conditions and instructions, for example for extending an existing configuration.

In line with one example development, the system matrix is therefore used to ascertain an existing customer configuration for the software product. This provides a simple way for the software provider to obtain information about the technical structure of a respective configuration which the customer uses for the complex general software product. Using this information, he can then purposefully initiate technical measures, for example maintenance measures, or else ascertain what program components at what version levels additionally need to be implemented with the customer in order to allow the desired additional functionality to work.

To simplify this, it is expediently provided for the system matrix for a customer configuration to be transmitted to an evaluation unit, particularly at the software provider's premises, where the statement in the system matrix is used to recreate the customer configuration in a technical respect in real terms as a test customer configuration. That is to say that the statements in the matrix are used to compile an actual, real executable complex software product. The software provider is therefore readily able to use its own premises to set up, test etc. the respective software product used by the customer. In particular, extensions can therefore be integrated and tested without difficulty directly by the provider before they are then implemented with the customer.

Expediently, the test customer configuration which is set up with the software provider is used to reproduce processes and preferably also to analyze errors. The recreated test customer configuration is therefore used for really checking and reproducing specific processes which have resulted in errors etc. with the customer, for example. This measure allows real reproduction of the situation in situ with the customer and permits precise customer-specific error diagnosis which is easy for the software provider to produce. In particular, it also provides the option of intercepting such errors through targeted measures.

In line with one example refinement, general provision is therefore made for a desired extension to an existing configuration for the complex software product by a new functionality to involve the use of the system matrix to ascertain what additional program components at what version level are required. In this context, in preferred alternatives, this extension relates both to existing customer configurations and to an extension of the general complex software product. In the latter case, the system matrix is used by the software provider in order to integrate completely new functionalities in the general complex software product.

When the system matrix is used to extend a functionality for a customer configuration, it is first of all stipulated what program components are required for executing the functionality. A comparison with the system matrix mapping the customer configuration is then used to ascertain the program components which are actually required. Effectively a nominal/actual comparison is therefore performed using the matrix in order to ascertain what program components at what version level are required for the new functionality. The standardized mapping process using the system matrix means that this comparison step is performed preferably automatically.

In line with one example refinement, at least one item of information (value) from an additional variable in the system matrix is stored for the individual program components in their respective versions. This additional variable, subsequently also referred to as attribute, therefore effectively forms a further dimension for the multidimensional matrix. To show this in graphically simple form for the user, provision is expediently made for, by way of example, alphanumeric or numeric descriptors with an information context to be used in the system matrix instead of simple crosses or ticks. In this regard, the descriptors (values) are entered in the individual fields of the matrix.

The use of such attributes provides the option of additionally storing a plurality of items of information. Preferably, what are known as n-tuples are used, that is to say a series of digits, in particular. In this context, the digits are arranged at discrete positions, what are known as fields, or are associated therewith, each field being associated with one of the other variables. The n-tuple means that it is possible to specify a multiplicity of further different types of information for a specific version level of a specific program component and also to specify a particular information content (value) for each of these different types of information.

In this context, the different types of information provided, individually or in combination, are the following types, in particular:
  frequency of error for the respective program component
  reference, for example indexing or else a direct link, to a development specification for the respective program component
  reference to test schedules for the development of new program components, and
  reference to documentation for the respective program component.

This additional information from the further variables provides a wealth of evaluation options in respect of the technical functionality of the software product or provides technical support for the compilation of accompanying material for the software product.

Thus, preferably, a further variable, particularly the frequency of error, for all the program components associated with a particular functionality is evaluated. By way of example, this makes it possible to ascertain the "stability" of a particular implemented functionality. This is done by using the "program component" variable for a defined functionality to form an integral of the frequencies of error in order to obtain a statement about the reliability of this functionality.

Alternatively or in addition, one expedient refinement provides for the further variable, particularly the frequency of error, for a respective one of the program components in its respective version to be evaluated in similar fashion to this over all functionalities. This provides the option of effectively ascertaining the "degree of maturity" of a specific program component in the respective version. Generally, the following applies: the lower the summed frequency of error, the more stable or the more mature the functionality or program component. In this case, it should naturally likewise be considered how frequently the respective functionality or program component is actually used.

In line with one expedient development, the reference to an item of documentation is used to compile an instruction manual for the customer. The statement in the system matrix means that it is therefore possible to provide a customer-specific instruction manual tailored to the customer configuration without difficulty and, in particular, automatically without this requiring a relatively high level of complexity.

The reference to a development specification for a new program component to be developed at the provider end easily provides the developer with notification of what requirements the new program component to be developed needs to have.

A crucial advantage of the system matrix can be seen in the standardization of the mapping of the individual technical functional relationships. This provides the option of an automated process. Expediently, an automatically executing routine, that is to say a separate software program or a separate algorithm, is therefore provided which is used to automatically evaluate the respective system matrix. Preferably, an automatic routine of this kind is used to automatically compile and reproduce an existing customer configuration using the system matrix.

A software program product is also disclosed in at least one embodiment, with an executable program code for carrying out the method of at least one embodiment. By way of example, the software program product is a data storage medium on which the program code is stored.

BRIEF DESCRIPTION OF THE DRAWINGS

Example embodiments of the invention are explained in more detail below with reference to the drawings, in which, in each case using schematic and highly simplified illustrations.

DETAILED DESCRIPTION OF THE EXAMPLE EMBODIMENTS

The terminology used herein is for the purpose of describing particular embodiments only and is not intended to be limiting of the present invention. As used herein, the singular forms "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

In describing example embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Referencing the drawings, wherein like reference numerals designate identical or corresponding parts throughout the several views, example embodiments of the present patent application are hereafter described. Like numbers refer to like elements throughout. As used herein, the terms "and/or" and "at least one of" include any and all combinations of one or more of the associated listed items. In the figures, parts and components which have the same action have been provided with the same reference symbols.

Figure 1:
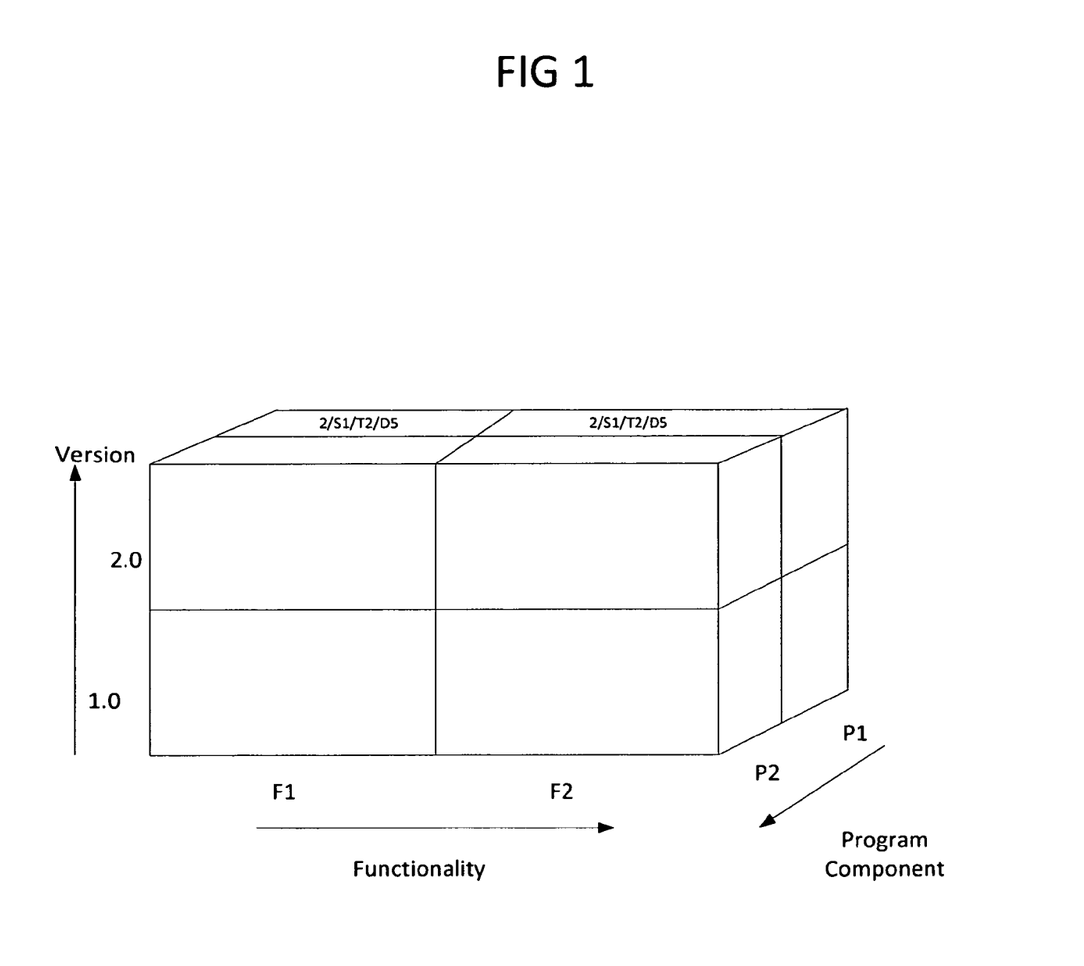
FIG. 1 shows a simplified graphical representation of a three-dimensional system matrix.

FIG. 1 is used to explain the basic structure of the system matrix M. Specifically, the matrix M in the example embodiment is formed by the graphical representation of a three-dimensional Cartesian coordinate system whose three axes are formed by the variables "functionality" F, "program component" P and "version level" V. In the exemplary embodiment, only two respective values are mapped for each variable F, P, V. For the variable F, these are the values F1, F2, for the variable P, these are values P1, P2, and for the variable V, these are the version levels 1.0 and 2.0. By way of example, F1, F2 represent the functionalities "osteoporosis evaluations", "network support" etc., and P1, P2, by way of example, represent the program components "user interface", "configuration", etc.

The complex software product which is mapped by the system matrix M shown in FIG. 1 accordingly has the two functionalities F1, F2, where the functionality F1 requires the program component P1 at version level 2.0 and the program component P2 at version level 1.0. By contrast, the functionality F2 resorts only to the program component P1 at version level 2.0. Both functionalities F1, F2 therefore access the program component P1 at version level 2.0.

The association between the individual program components P at their respective version levels V and the respective functionalities F is represented by shading of the respective matrix fields in the example embodiment. In principle, the widest variety of options for identifying the association are suitable here. Real systems, that is to say real complex software products, normally have a multiplicity of functionalities F and program components P at a wide variety of version levels V. A system matrix M for a real complex software product is therefore normally of much more comprehensive design. By way of example, the system matrix M is stored in a memory in tabular form. It can be shown in three dimensions in similar fashion to in FIG. 1. Alternatively, it is also possible to show details thereof in three-dimensional form or else in two-dimensional form, respectively, in order to make it easier for the user (developer) to work with the system matrix M.

In principle, pure tabular storage in a memory is also sufficient, particularly if the information stored in the system matrix M is evaluated automatically using an appropriate software routine.

The example embodiment shown in FIG. 1 contains additional information for the three variables F, P, V. Specifically, further variables stored are the frequency of error, references to a specification, to a test plan and to an item of documentation. This is stored in a respective matrix field by what is known as an n-tuple. Each field of this n-tuple is associated with a particular further variable. The value or descriptor entered in this field indicates a precise item of information for the respective variable. The respective n-tuples are associated with the respective program component P at its respective version level V. Thus, the program component P1 at version level 2.0 has the associated n-tuple (2/S1/T2/D5). In the example embodiment, this means:

for the program component P1 at version level 2.0, two errors have already arisen, the development specification S1 is/was pertinent, the test schedule T2 needs to be taken into account for the development or implementation and also the documentation D5 (instruction manual) is associated. Since the functionality F2 accesses the same program component at the same version level V, the identical n-tuple is indicated in this matrix field. In this context, the frequency of error indicates how many errors have already been detected in this regard.

The specification determines what requirements the respective program component P needs to meet, the test schedule indicates what tests need to be performed, and finally the documentation is the associated documentation for this specific program component P at the respective version level V.

The system matrix M described here is a simple, uniform and standardized process for mapping complex technical software products using just a few entries/data items. The fundamental advantage of this representation in the system matrix M can be seen in that a complex technical system is mapped to the full extent in simplified fashion. On the basis of this mapping, it is possible to derive, implement, schedule etc. a wide variety of technical measures. In particular, this matrix is used for technical support when adding a further functionality to an existing software product in a defined (customer) configuration, or to extend the overall software product by a functionality requiring fresh development. The matrix M can therefore be used universally both for customer-specific interests and for interests of the software provider on the development side and for fresh developments. Precisely on account of this universality and standardization, the system matrix M makes it possible to provide automated processes using specific routines which are used to edit, evaluate etc. the matrix M automatically.

Figure 2:
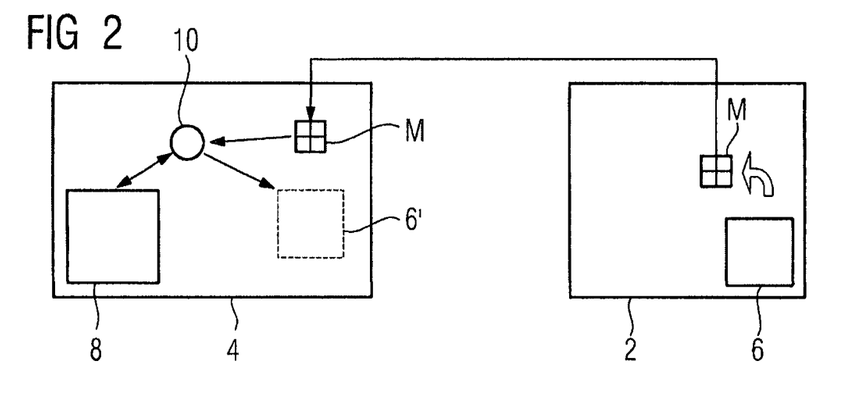
FIG. 2 shows a schematic block diagram to illustrate the reproduction of a customer configuration by a software provider using the system matrix.

A first purpose of use for the system matrix is explained with reference to FIG. 2. This shows a customer end 2 in the right-hand half of the figure and a provider end 4 in the left-hand half of the figure. The customer end 2 is a computer system used by the customer, in particular. In this case, customer is understood to mean particularly an organizational unit, such as a company, particularly a clinic or else a doctors' practice in a medical sector.

In particular, the provider end 4 is likewise a computer system which is installed with a manufacturer/provider for the complex software product. Both the customer end 2 and the provider end 4 may be locally distributed over a plurality of locations. The relevant computer systems are networked to one another in this context, for example.

The customer end 2 has a customer configuration 6 installed for the complex software product. The provider end 4 is provided with the associated general complex software product. The general complex software product contains all the complex software product's functionalities provided by the provider and the program components P at their different version levels V which are required for this.

By contrast, the customer configuration 6 represents a particular selection of these functionalities F with the associated program components P at their respective version levels V.

If an error occurs in the customer configuration 6, for example, then checking what the error can be attributed to requires precise knowledge of the respective specific customer configuration 6. In this regard, FIG. 2 shows provision for the system matrix M associated with the customer configuration 6 to be provided at the customer end 2. Preferably, this matrix is produced whenever the respective customer configuration 6 is installed with the customer, and is updated and continued with every extension, so that this matrix M can be retrieved at any time. It therefore does not need to be produced in complex fashion. The matrix M is sent to the provider end 4, for example by the Internet, using a data storage medium etc. An evaluation unit 10 is used to read in and evaluate this matrix M, and a test customer configuration 6' corresponding to the customer configuration 6 is automatically created and set up. That is to say that the software product installed for the customer is actually now also available at the provider end 4 in identical form.

To reproduce the customer configuration 6, the evaluation unit 10 evaluates the matrix M and checks what functionalities are available with the customer in what manner. That is to say that the evaluation unit 10 uses the matrix M to check what program components P at what version level V are used to execute a respective functionality F. Using this information, the evaluation unit 10 compiles the relevant functionalities F, components P at the version levels V, preferably automatically from the general complex software product 8 provided and reproduces the customer configuration 6.

The test customer configuration 6' can now be used to simulate and test processes at the provider end 4 in order to perform meaningful error analysis in this manner, for example. To eliminate these errors, it is possible to initiate and particularly also test suitable measures before they are then entered in the customer configuration 6.

Figure 3:
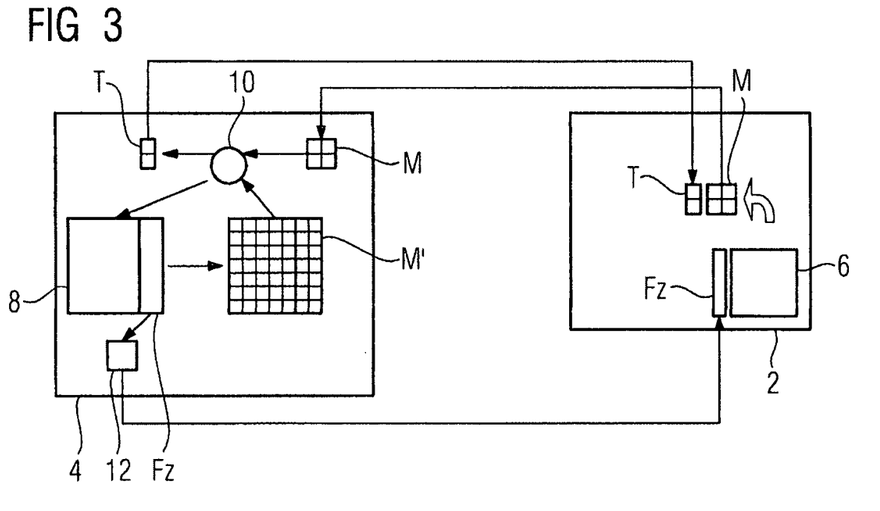
FIG. 3 shows a schematic block diagram to explain extension of an existing customer configuration by a new functionality using the system matrix.

FIG. 3 shows the procedure when extending the customer configuration 6 by an additional functionality Fz. First, the matrix M is in turn provided at the customer end 2 and transmitted to the provider end 4. There, the matrix M is in turn automatically evaluated, particularly in respect of the customer requirement to extend its customer configuration 6 by the functionality Fz. This is included at the provider end 4 in the general software product 8, i.e. this is already a basically existing functionality Fz provided by the provider. The evaluation unit 10 now compares the matrix M with a matrix M' which represents the general complex software program 8.

In particular, the evaluation unit 10 compares what program components P at what respective version level V are needed for the desired additional functionality Fz, and to what extent they are already included in the customer configuration. As soon as the evaluation unit 10 has established what additional program components P at what respective version level V are required for implementing the additional functionality Fz, it prompts them to be compiled in an update packet 12. This update packet 12 is transmitted to the customer end 2, where it is installed using an installation routine, so that the customer configuration 6 is extended by the additional functionality Fz.

At the same time, the evaluation unit 10 preferably produces a table T, which is likewise sent to the customer end 2. The table T is used to extend the matrix M by the changes made. Alternatively, the evaluation unit 10 reworks a full matrix M, which corresponds to the then new customer configuration 6 extended by the additional functionality Fz, and sends it to the customer end 2.

Figure 4:
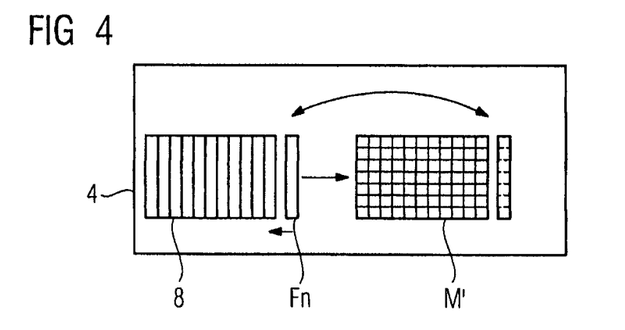
FIG. 4 shows a schematic illustration to explain the extension of the total software product by a further functionality as part of further development by the software provider.

FIG. 4 is used to explain the further development of the general complex software product 8 at the provider end 4. In this regard, a developer or a development team likewise uses the matrix M' which corresponds to the general complex software product 8. Specifically, in respect of the scheduled extension by a new functionality Fn, the matrix M is used to define what program components P are required for the functionality Fn at what version level V. A comparison is then made to determine whether the required program components P are already included or whether new program components or amended program components (new version) are required. These are then redeveloped into the general complex software product 8 in order to implement the new functionality Fn. In parallel with this, the matrix M' is extended by the new functionality Fn. Within this extension n, n-tuples are now preferably used to define what specifications need to be taken into account, what test cycles are required etc.

Figure 5:
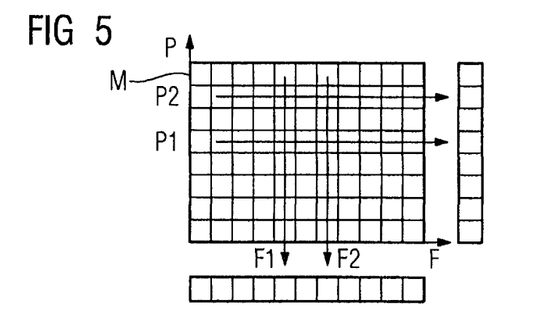
FIG. 5 shows a schematic illustration to explain evaluation in respect of the stability of a functionality or the degree of maturity of a program component.

FIG. 5 is used to describe the performance of an evaluation using the matrix M. In this case, the matrix M is shown in two dimensions for the sake of simplicity, with the columns showing the functionality F and the rows showing the program components P. For the purpose of evaluation, provision is now made either for integration to be performed over the variable P for a defined functionality F or for integration to be performed over the variable F for a defined value for P. In particular, to check the stability of a functionality F1, F2, for example, the frequency of error for all program components P at their respective version levels which are used for the functionality F is summed. Conversely, to ascertain the degree of maturity of a particular program component P1, P2 at a respective version level, integration is performed over all functionalities F, this involving the use of these program components P1, P2 at the respective version level V. This statistical evaluation, which is very simple using the system matrix 6, can easily be used to make qualitative statements.

Figure 6:
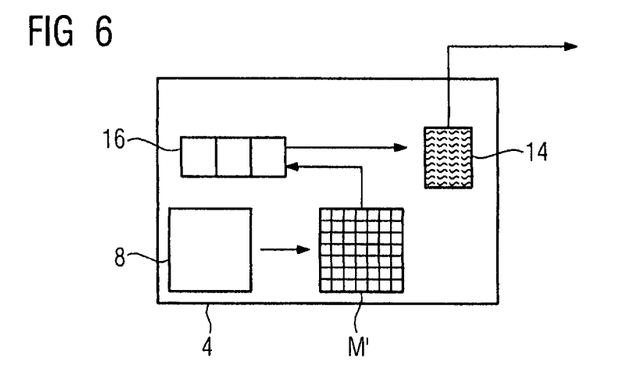
FIG. 6 shows a schematic illustration to demonstrate the compilation of an item of documentation using the system matrix.

Finally, FIG. 6 is also used to explain the, in particular automatic, creation of a customer-specific item of documentation/instruction manual. Using the reference to an associated item of documentation for the respective program component P, which reference is described in regard to FIG. 1, the system matrix M is used, preferably at the provider end 4, to automatically create a customer-specific item of documentation 14 using the evaluation unit 10 (not shown in more detail here). To this end, again all the program components P used by the customer at their respective version levels are first of all ascertained using the system matrix M. On the basis of the n-tuple, which is typically stored only at the provider end, the associated individual items of documentation are then selected from a documentation pool 16 and compiled to form the customer-specific documentation 14. This is then sent to the customer end 2. In this way, sections of documentation for individual functionalities F can also be automatically created without difficulty.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program and computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a computer readable media and is adapted to perform any one of the aforementioned methods when run on a computer device (a device including a processor). Thus, the storage medium or computer readable medium, is adapted to store information and is adapted to interact with a data processing facility or computer device to perform the method of any of the above mentioned embodiments.

The storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for mapping a structure of a complex software product, comprising:
   implementing a plurality of functionalities in the complex software product, each functionality being formed by interaction of a plurality of executable program components associated with each functionality, the program components including one of a plurality of version levels;
   generating an at least three-dimensional system matrix, the system matrix having at least three axes representing at least a functionality variable, a program component variable, and a version level variable, at least one item of information from a further variable being stored for each of the plurality of program components in the version level variable, the further variable including each of, frequency of error in the program component from a particular version level, reference to a specification for the program component from a particular version level, the specification specifying requirements for the plurality of program components to meet, reference to test schedules for the development of new program components from a particular version level, and reference to documentation for the program component from a particular version level;
   mapping an association between the program components at their respective version level and the functionalities in the system matrix;
   using the system matrix to ascertain an existing customer configuration for the complex software product, the customer configuration being the complex software product usable by a customer; and
   transmitting the system matrix of the existing customer configuration to an external evaluation unit, where the transmitted system matrix is used to construct a test customer configuration identical to the existing customer configuration.

2. The method as claimed in claim 1, further comprising at least one of:
   reproducing processes using the test customer configuration, and
   analyzing errors using the test customer configuration.

3. The method as claimed in claim 1, further comprising:
   implementing a new functionality in the complex software product, the system matrix being used to ascertain what additional program components are required at what version level.

4. The method as claimed in claim 3, wherein the new functionality is provided by a software product manufacturer and implemented in the existing customer configuration, execution of the new functionality requiring defined program components, and wherein the additionally required program components are ascertained by using the system matrix to ascertain which of the defined program components are already implemented in the software product.

5. The method as claimed in claim 3, wherein the new functionality is implemented as part of further development of the complex software product.

6. The method as claimed in claim 1, wherein the at least one item of information in the system matrix corresponds to a value in a field associated with the respective component at the respective version level.

7. A method for mapping a structure of a complex software product, comprising:
implementing a plurality of functionalities in the complex software product, each functionality being formed by interaction of a plurality of executable program components associated with each functionality, the program components including one of a plurality of version levels;
generating an at least three-dimensional system matrix, the system matrix having at least three axes representing at least a functionality variable, a program component variable, and a version level variable;
the system matrix storing at least one item of information from a further variable for the individual program components in the respective version, the at least one item of information in the system matrix being indicated as a value in a field associated with the respective component at the respective version level, the system matrix having a plurality of additional items of information in the respective field of the system matrix are indicated as n-tuples, the n-tuples being a series of digits, the digits being arranged at discrete positions and the digits associated to the respective additional items of information, the digits of the n-tuple indicating, a frequency of error in the program component from a particular version level, a specification for the program component from a particular version level, the specification specifying requirements for each of the plurality of program components to meet, a test schedule for the development of new program components from a particular version level, and a documentation associated with a respective program component for a particular version level; and
mapping an association between the program components at their respective version level and the functionalities in the system matrix.

8. The method as claimed in claim 1, further comprising:
evaluating the further variable for all program components associated with a particular functionality.

9. The method as claimed in claim 1, further comprising:
evaluating the further variable over all functionalities for a respective one of the program components in the respective version.

10. The method as claimed in claim 7, further comprising:
creating overall documentation from the one or more references to documentation for different program components in the respective version.

11. The. method as claimed in claim 1, further comprising:
additionally using a routine to automatically evaluate the system matrix.

12. A non-transitory computer readable medium including program segments for, when executed on a computer device, causing the computer device to implement the method of claim 1.

13. A non-transitory computer readable medium including program segments for, when executed on a computer device, causing the computer device to implement the method of claim 7.

14. A non-transitory computer readable medium including program segments for, when executed on a computer device, causing the computer device to implement the method of claim 10.

15. The method of claim 1, further comprising:
at least one of checking, verifying, and extending an existing customer configuration for the software product using the system matrix.

16. The method of claim 1, further comprising:
extending the complex software product on the software provider side using the system matrix.

* * * * *